US011335904B2

(12) United States Patent
Troegel et al.

(10) Patent No.: US 11,335,904 B2
(45) Date of Patent: May 17, 2022

(54) COMPOSITE CORE-SHELL PARTICLES

(71) Applicant: WACKER CHEMIE AG, Munich (DE)

(72) Inventors: Dennis Troegel, Ottensoos (DE); Stefan Haufe, Neubiberg (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/556,717

(22) PCT Filed: Feb. 14, 2017

(86) PCT No.: PCT/EP2017/053210
§ 371 (c)(1),
(2) Date: Sep. 8, 2017

(87) PCT Pub. No.: WO2017/140642
PCT Pub. Date: Aug. 24, 2017

(65) Prior Publication Data
US 2018/0342732 A1    Nov. 29, 2018

(30) Foreign Application Priority Data

Feb. 17, 2016  (DE) .......................... 102016202459.0

(51) Int. Cl.
*H01M 4/36*    (2006.01)
*H01M 4/133*   (2010.01)
(Continued)

(52) U.S. Cl.
CPC ........... *H01M 4/366* (2013.01); *H01M 4/133* (2013.01); *H01M 4/134* (2013.01); *H01M 4/386* (2013.01);
(Continued)

(58) Field of Classification Search
CPC .... H01M 4/366; H01M 4/133; H01M 4/1393; H01M 4/583; H01M 4/625; H01M 4/386; H01M 4/134; H01M 4/1395
See application file for complete search history.

(56) References Cited

U.S. PATENT DOCUMENTS 6,770,399 B2      8/2004  Umeno et al.
7,722,991 B2 *    5/2010  Zhang ................... H01M 4/134
                                                       429/231.95

(Continued)

FOREIGN PATENT DOCUMENTS

CN    103594677 A    2/2014
CN    102623680 B    3/2014
(Continued)

OTHER PUBLICATIONS

English language abstract for CN 104300125 A (2015).
(Continued)

Primary Examiner — Jeremiah R Smith
(74) Attorney, Agent, or Firm — Caesar Rivise, PC

(57) ABSTRACT

The invention relates to composite core-shell particles wherein the core is a porous, carbon-based matrix which contains silicon particles enclosed in pores of the matrix; the pores containing the silicon particles have a diameter of ≥60 nm as determined by scanning electron microscopy (SEM); the shell can be obtained by carbonizing one or more carbon precursors selected from among the group comprising tars, pitches, hard carbon, soft carbon and hydrocarbons having 1 to 20 carbon atoms, resulting in a non-porous shell.

31 Claims, 2 Drawing Sheets

(51) Int. Cl.
  *H01M 4/134* (2010.01)
  *H01M 4/38* (2006.01)
  *H01M 4/583* (2010.01)
  *H01M 10/0525* (2010.01)
  *H01M 4/02* (2006.01)
  *H01M 4/1395* (2010.01)
  *H01M 4/1393* (2010.01)
  *H01M 4/62* (2006.01)

(52) U.S. Cl.
  CPC .......... *H01M 4/583* (2013.01); *H01M 4/1393* (2013.01); *H01M 4/1395* (2013.01); *H01M 4/625* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 8,361,659 B2 | 1/2013 | Richard | |
| 9,905,842 B2 | 2/2018 | Kim et al. | |
| 2007/0092428 A1 | 4/2007 | Sotowa et al. | |
| 2010/0285359 A1* | 11/2010 | Hwang | H01M 4/133 429/219 |
| 2011/0311873 A1 | 12/2011 | Schulz et al. | |
| 2012/0100438 A1 | 4/2012 | Fasching et al. | |
| 2012/0164531 A1 | 6/2012 | Chen et al. | |
| 2013/0045423 A1 | 2/2013 | Lim et al. | |
| 2013/0130115 A1 | 5/2013 | Park et al. | |
| 2013/0323595 A1 | 12/2013 | Sohn et al. | |
| 2014/0057179 A1* | 2/2014 | Yushin | H01M 4/364 429/238 |
| 2014/0272592 A1 | 9/2014 | Thompkins et al. | |
| 2014/0322606 A1* | 10/2014 | Lee | H01M 4/366 429/222 |
| 2015/0270538 A1 | 9/2015 | Kim et al. | |
| 2015/0368113 A1* | 12/2015 | Cho | C01B 33/03 429/221 |
| 2016/0013481 A1 | 1/2016 | Jeong et al. | |
| 2016/0365567 A1 | 12/2016 | Troegel et al. | |
| 2017/0033360 A1* | 2/2017 | Michaud | H01M 10/0525 |

FOREIGN PATENT DOCUMENTS

| | | | |
|---|---|---|---|
| CN | 104300125 A | 1/2015 | |
| CN | 104319401 A | 1/2015 | |
| CN | 104332632 A | 2/2015 | |
| EP | 1205989 A2 | 5/2002 | |
| JP | 2006228640 A | 8/2006 | |
| JP | 102623680 * | 3/2014 | ............. H01M 4/38 |
| KR | 10-2010-0120919 A | 11/2010 | |
| KR | 101494715 B1 | 2/2015 | |
| WO | 2010006763 A1 | 1/2010 | |
| WO | 2014031929 A1 | 2/2014 | |
| WO | 2015051309 A1 | 4/2015 | |
| WO | 2015117838 A1 | 8/2015 | |

OTHER PUBLICATIONS

English language abstract for CN 104319401 A (2015).
English language abstract for CN 104332632 A (2015).
English language abstract for JP 2006228640 A (2006).
English language abstract for KR 101494715 B1 (2015).
Ahn et al. (2015). Elucidating relationships between structural properties of nanoporous carbonaceous shells and electrochemical performances of Si@ carbon anodes for lithium-ion batteries. The Journal of Physical Chemistry C, 119(19), 10255-10265.
Li et al. (2014). A novel approach to prepare Si/C nanocomposites with yolk-shell structures for lithium ion batteries. RSC Advances, 4(68), 36218-36225.
Li et al. (2014). Silicon/carbon composite microspheres with hierarchical core-shell structure as anode for lithium ion batteries. Electrochemistry Communications, 49, 98-102.
Li et al. (2015). Bridging porous Si—C composites with conducting agents for improving battery cycle life. Journal of Power Sources, 286, 534-539.
Liu et al. (2014). A pomegranate-inspired nanoscale design for large-volume-change lithium battery anodes. Nature nanotechnology, 9(3), 187-192.
Liu et al. (2014). A pomegranate-inspired nanoscale design for large-volume-change lithium battery anodes. Supplementary Information. Nature nanotechnology, 9(3), S1-S18.
Pan et al. (2014). Facile synthesis of yolk-shell structured Si—C nanocomposites as anodes for lithium-ion batteries. Chemical communications, 50(44), 5878-5880.
Sun et al. (2015). A Silicon/Double-Shelled Carbon Yolk-Like Nanostructure as High-Performance Anode Materials for Lithium-Ion Battery. Journal of The Electrochemical Society, 162(8), A1530-A1536.
Tao et al. (2014). Hollow core-shell structured Si/C nanocomposites as high-performance anode materials for lithium-ion batteries. Nanoscale, 6(6), 3138-3142.
Shao et al. (2013). Nanostructured silicon/porous carbon spherical composite as a high capacity anode for Li-ion batteries. Journal of Materials Chemistry A, 1(47), 15068-15075.
Shin et al. (2011). Synthesis of silicon/carbon, multi-core/shell microspheres using solution polymerization for a high performance Li ion battery. Electrochimica Acta, 58, 578-582.
Wang et al. (2014). Three-Dimensional Porous Carbon-Silicon Frameworks as High-Performance Anodes for Lithium-Ion Batteries. ChemElectroChem, 1(12), 2124-2130.
Yue et al. (2014). Designing Si/porous-C composite with buffering voids as high capacity anode for lithium-ion batteries. Electrochimica Acta, 125, 206-217.
International Search Report from corresponding PCT/EP2017/053210 dated May 11, 2017.
English Abstract for CN 102623680 B (2014).

\* cited by examiner

COMPOSITE CORE-SHELL PARTICLES

CROSS-REFERENCE TO RELATED APPLICATIONS

This application is a U.S. National Phase Application of PCT/EP2017/053210, filed Feb. 14, 2017, which claims priority to DE 10 2016 202 459.0, filed Feb. 17, 2016, the contents of which applications are incorporated herein by reference in their entireties for all purposes.

BACKGROUND OF THE INVENTION

The present invention relates to core-shell composite particles, processes for the production thereof and the use thereof in anode active materials for lithium ion batteries.

As storage media for electric power, lithium ion batteries are at present the practical electrochemical energy stores having the highest energy densities. Lithium ion batteries are utilized first and foremost in the field of portable electronics for tools and also for electrically powered transport means such as bicycles or automobiles. Graphitic carbon is at present widespread as material for the negative electrode ("anode") of corresponding batteries. However, a disadvantage is its relatively low electrochemical capacity of theoretically not more than 372 mAh per gram of graphite, which corresponds to only about a tenth of the theoretically achievable electrochemical capacity when using lithium metal. The development of alternative anode materials led to addition of silicon. Silicon forms binary electrochemically active alloys with lithium, which have very high lithium contents and, for example for $Li_{4.4}Si$, can achieve theoretical specific capacities in the region of 4200 mAh per gram of silicon.

The incorporation and release of lithium into/from silicon is disadvantageously associated with a very large volume change which can attain about 300%. Such volume changes subject the crystallites a high mechanical stress, for which reason the crystallites can finally break apart. This process, which is also referred to as electrochemical milling, leads to a loss of electrical contacting in the active material and in the electrode structure and thus to destruction of the electrode with a loss of capacity.

Furthermore, the surface of the silicon anode material reacts with constituents of the electrolytes with continuous formation of passivating protective layers (solid electrolyte interface; SEI), which leads to immobilization of lithium. Owing to the extreme volume change of the silicon during the charging or discharging process of the battery, the SEI normally ruptures, as a result of which further surfaces of the silicon anode material are exposed and are then subjected to further SEI formation so that a continuous irreversible loss of lithium ions results during operation of the battery. Since the amount of mobile lithium, which corresponds to the usable capacity, is limited in the full cell by the cathode material, it is quickly consumed and the capacity of the cell drops to an extent which is not acceptable in use even after a few cycles.

The decrease in the capacity over the course of a number of charging and discharging cycles is also referred to as fading or continuous loss of capacity and is generally irreversible.

To counter these problems, various Si/C composites in which the silicon is embedded in carbon matrices have been developed.

Thus, a number of porous Si/C composites in which both the silicon particles and the pores in the carbon matrix are distributed in an undefined, random manner as described, for example, by L.-Z. Fan et al. in ChemElektroChem, 2014, 1, 2124; L. Zhang et al. in J. Mater. Chem. A 2013, 1, 15068; Z. Liu et al. in J. Power Sources 2015, 286, 534; WO10006763; US2013130115; KR101494715; US2013045423 or JP2006228640, are known. Analogous Si/C composites are provided with an outer coating in the following documents: U.S. Pat. No. 6,770,399; B. Li et al. in Elektrochem. Comm. 2014, 49, 98; US2012164531; US2013323595; WO14031929 or US20120100438. In Electrochimica Acta 2011, 58, 578, Y.-K. Sun et al. also describe Si/C composite particles in which the silicon particles and the pores are randomly distributed in the carbon matrix. Pores having diameters in the range from 0.4 to 50 nm are typical for such composites. Such composites are classified as microporous or mesoporous. The pores are usually considerably smaller than the silicon particles. None of these documents disclose any Si/C composites in which the silicon particles are encapsulated in the pores of the composites.

Furthermore, porous Si/C composites having macropores in which the silicon particles are incorporated, as described, for example, by J. Ahn et al. in J. Phys. Chem. C. 2015, 119, 10255, are known. The Si/C composites of J. Ahn et al. are enveloped by a porous and thus permeable carbon film. CN 104319401 relates to processes for producing porous Si/C composites using $SiO_2$ templates, by which means Si nanoparticles are embedded in the pores of the composites. The surface of the Si/C composites is porous. An analogous situation also applies in the core-shell Si/C nanocomposites of L.-Z. Fan et al. in Nanoscale 2014, 6, 3138, or by Z. Sun et al. J. Elektrochem. Soc. 2015, 162, A1530. In Chem. Commun. 2014, 50, 5878, L. Li et al. describe "yolk-shell" Si/C nanocomposites in which silicon particles are firstly coated with carbon and part of the silicon is subsequently leached from the composites by means of sodium hydroxide solution, so that small pores are formed around the remaining silicon particles in the interior of the C shell. In RSC Adv. 2014, 4, 36218, J.-P. Zhang et al. describe Si/C nanocomposites which have a "yolk-shell" structure and in which mesoporous silicon particles are provided with a carbon shell. Here, part of the volume expansion is absorbed by the mesoporous structure of the silicon. In Elektrochimica Acta 2014, 125, 206, L. Zhang et al. describe porous Si/C composites in some of the pores of which Si particles are embedded. Here too, a template is removed by an etching step using hydrofluoric acid. The composite particles are thus not impermeable to liquid media. U.S. Pat. No. 7,722,991 discloses composite particles having a porous matrix and pore channels. The active material is embedded in pores. U.S. Pat. No. 8,361,659 claims porous carbon composites having a pore volume which is filled to an extent of from 50 to 100% with active material. The pore spaces are joined to one another and to the composite surface by pore channels. CN104300125 describes porous pomegranate-like Si/C composites having defined hollow spaces in the C matrix, in which Si nanoparticles are embedded.

In Nature Nanotechnology 2014, 9, 187, Y. Cui et al. describe porous Si/C composites having a pomegranate-like structure based on amorphous carbon. The Si nanoparticles are embedded therein in defined hollow spaces. The silicon content of the composites is >60% by weight and the proportion of carbon of the matrix is correspondingly low, so that the carbon matrix enveloping the Si nanoparticles is comparatively thin-walled. Although such a procedure makes high gravimetric capacities mAh/g) possible, it ultimately limits the volumetric capacity. The Si/C composite structures of Cui et al. are not impermeable to liquid media, which can be seen from, for example, the fact that the embedded Si nanoparticles can be leached completely from the porous carbon structure by aqueous sodium hydroxide solution, as indicated in the Supplementary Information to Nature Nanotechnology 2014, 9, 187. CN104332632 describes porous Si/C composites which have a core-shell structure and are made up of a silicon core, a buffer layer containing hollow carbon spheres and an outer carbon coating to increase the mechanical stability and conductivity. However, liquid can be incorporated into the buffer layer, so that the Si/C composites are not liquid-impermeable. WO215051309 too, relates to porous Si/C composites having a pomegranate structure. The embedded Si nanoparticles can be leached out by means of aqueous alkalis, for which reason the carbon matrix is not liquid-impermeable. Problematically, only part of the SEI is formed on the outer composite surface. To improve the surface properties, the application of additional, conductive coatings such as copper is described in WO215051309. Such Si/C composites display reduced SEI formation and more stable electrochemical properties. Copper has a relatively high density, so that the gravimetric capacity of such porous Si/C composites is drastically reduced. Copper does not form any alloys with lithium, so that copper coatings actually represent barrier layers for lithium ions. The fact that the copper-coated Si/C composites of WO215051309 are nevertheless active in lithium ion batteries is evidence for the lack of impermeability of the Si/C composites.

In the light of this background, it was an object of the invention to provide composite particles which contain silicon particles and when used in lithium ion batteries make a high cycling stability possible, in particular lead to an as low as possible SEI formation and/or reduce electrochemical milling. In addition, the silicon-containing composite particles should if possible have a high mechanical stability and display as little brittleness as possible.

DESCRIPTION OF THE INVENTION

The invention provides core-shell composite particles, wherein the core is a porous, carbon-based matrix which contains silicon particles in which the silicon particles are enclosed in the pores of the matrix and the pores containing silicon particles have a diameter of ≥60 nm (method of determination: scanning electron microscopy (SEM)) and the shell is obtainable by carbonization of one or more carbon precursors selected from the group consisting of tars, pitches, hard carbon, soft carbon and hydrocarbons having from 1 to 20 carbon atoms, which leads to a nonporous shell.

The pores containing silicon particles are generally embedded in the matrix. The matrix can be considered to be a framework for the pores. The individual pores are preferably isolated. The pores are preferably not connected to one another via channels. The shape of the pores can, for example, be ellipsoidal, elongated, angular, splinter-like or preferably spherical.

The pore walls have a thickness of preferably from 4 to 330 nm, particularly preferably from 24 to 240 nm and most preferably from 50 to 146 nm (method of determination: scanning electron microscopy (SEM)). The thickness of the pore walls is generally the shortest distance between two pores.

The volume of a pore preferably corresponds to at least three times and particularly preferably at least 3.2 times and most preferably at least 3.3 times the volume of the silicon particle present therein. The volume of a pore preferably corresponds to not more than 4 times and particularly preferably not more than 3.7 times and most preferably not more than 3.4 times the volume of the silicon particle present therein (method of determination: 1 minus [ratio of the apparent density (determined by means of xylene pycnometry in accordance with DIN 51901) and the skeletal density (determined by means of He pycnometry in accordance with DIN 66137-2)]).

The surface of the silicon particles present in the pores according to the invention has essentially no contact with the matrix. Such silicon particles are thus present essentially in the free volume of a pore. Such silicon particles generally have contact with the matrix only at the place where the silicon particles within a pore come to rest on the matrix. Bonding of the silicon particles to the matrix can also be present at this place. A place of linkage of the silicon particles to the matrix is generally local and occupies only a minor part of the surface of a silicon particle.

The pores of the matrix which contain silicon particles have diameters of ≥60 nm, preferably ≥80 nm, particularly preferably ≥150 nm and most preferably ≥290 nm. The pores of the matrix which contain silicon particles have diameters of preferably ≤1400 nm, more preferably ≤700 nm, particularly preferably ≤500 nm and most preferably ≤350 nm (method of determination: scanning electron microscopy (SEM)). The data concerning pore diameters are preferably satisfied by the largest diameter of two, particularly preferably three, mutually orthogonal diameters. The volume of a silicon particle present in a pore is added to the volume of the pore in the determination of a pore diameter.

The silicon particles are generally submicron size or nanosize. Preferred silicon particles have volume-weighted particle size distributions having diameter percentiles $d_{50}$ of preferably ≥50 nm, more preferably ≥80 nm, particularly preferably ≥100 nm and most preferably ≥150 nm. The abovementioned diameter percentiles $d_{50}$ are preferably ≤800 nm, particularly preferably ≤400 nm and most preferably ≤250 nm.

The volume-weighted particle size distribution can, for the purposes of the invention, be determined in accordance with ISO 13320 by means of static laser light scattering using the Mie model and the Horiba LA 950 measuring instrument using ethanol as dispersion medium for the silicon particles.

The ratio of the diameter of the pores of the matrix containing silicon particles to the diameter of the silicon particles is preferably ≥1.1, particularly preferably ≥1.6 and most preferably ≥1.8. The abovementioned ratio of the diameters is preferably ≤3, particularly preferably ≤2.5 and most preferably ≤2 (method of determination: scanning electron microscopy (SEM)).

The pores of the matrix containing silicon particles preferably contain ≤10, particularly preferably ≤5, even more preferably ≤3 and most preferably one, silicon particle(s).

The proportion of the silicon particles which are present in pores of the matrix according to the invention is preferably ≥5%, more preferably ≥20%, even more preferably ≥50%, particularly preferably ≥80% and most preferably ≥90%, based on the total number of silicon particles of the core-shell composite particles (method of determination: scanning electron microscopy (SEM)).

The silicon particles can be isolated or agglomerated, but preferably not aggregated, in the composite structure. The silicon particles are preferably not aggregated, preferably not agglomerated and/or preferably not nanostructured.

Aggregated means that spherical or largely spherical primary particles as are, for example, initially formed in gas-phase processes in the production of the silicon particles grow together in the further course of the reaction of the gas-phase process and in this way form aggregates. These aggregates can form agglomerates in the further course of the reaction. Agglomerates are a loose accumulation of aggregates. Agglomerates can easily be broken up into the aggregates again by means of kneading and dispersing methods typically used. Aggregates cannot be broken up, or only partially broken up, into the primary particles using these methods. The presence of silicon particles in the form of aggregates or agglomerates can be made visible, for example, by means of conventional scanning electron microscopy (SEM). In contrast, static light scattering methods for determining the particle size distributions or particle diameters of silicon particles cannot distinguish between aggregates or agglomerates.

Silicon particles which are not nanostructured generally have characteristic BET surface areas. The BET surface areas of the silicon particles are preferably from 0.01 to 30.0 $m^2/g$, more preferably from 0.1 to 25.0 $m^2/g$, particularly preferably from 0.2 to 20.0 $m^2/g$ and most preferably from 0.2 to 18.0 $m^2/g$. The BET surface area is determined in accordance with DIN 66131 (using nitrogen).

The silicon particles can, for example, be present in crystalline or amorphous form and are preferably not porous. The silicon particles are preferably spherical or splinter-like particles. As an alternative, but less preferably, the silicon particles can also have a fiber structure or be present in the form of silicon-containing films or coatings.

The silicon particles can, for example, be based on elemental silicon, silicon oxide or silicon/metal alloys. Preference is given to elemental silicon since this has the greatest storage capacity for lithium ions.

The silicon particles can preferably consist of high-purity polysilicon but also of deliberately doped silicon or metallurgical silicon, which can have elemental contamination. Furthermore, it can be present alloyed with other metals and elements in the form of silicides, e.g. with metals such as Li, Sn, Ca, Co, Ni, Cu, Cr, Ti, Al, Fe etc., known from the literature. These alloys can be binary, ternary or multinary. To increase the electrochemical storage capacity, a particularly low content of foreign elements is preferred.

The surface of the silicon particles can be chemically modified. Typical surface functions can be: Si—H, Si—Cl, Si—OH, Si—Oalkyl, Si—Oaryl, Si-alkyl, Si-aryl, Si—Osilyl. Particular preference is given to surface groups which can physically or chemically bind to the carbon precursors as are described below for the core. The attached surface groups can contain functional groups and be monomeric or polymeric as desired. They can be bound only via one or more molecular chains to the Si surface or bridge a plurality of Si particles.

The core, or the matrix, of the core-shell composite particles has volume-weighted particle size distributions having diameter percentiles $d_{50}$ of preferably ≥1 µm, particularly preferably ≥5 µm and most preferably ≥10 µm. The $d_{50}$ is preferably ≤90 µm, more preferably ≤50 µm, particularly preferably ≤36 µm and most preferably ≤20 µm.

The matrix can additionally contain pores having diameters of ≤59 nm, in particular from 2 to 50 nm (method of determination: pore size distribution by the BJH method (gas adsorption) in accordance with DIN 66134). Such pores can be uniformly distributed in the matrix. Such pores preferably do not contain any silicon particles.

The matrix is generally based on carbon, in particular crystalline or amorphous carbon. Mixtures of crystalline and amorphous carbon or carbon having crystalline and amorphous sub-regions are also possible. The matrix generally has a spherical, for example ball-like, shape.

The matrix is preferably based to an extent of from 40 to 90% by weight and particularly preferably from 60 to 80% by weight on carbon. The matrix preferably contains from 10 to 60% by weight and particularly preferably from 15 to 40% by weight of silicon particles. The figures in % by weight are in each case based on the total weight of the core of the core-shell composite particle.

The portion of the core is preferably from 80 to 95% by weight and particularly preferably from 85 to 93% by weight, based on the total weight of the core-shell composite particle.

The carbon of the matrix is, for example, obtainable by carbonization of one or more carbon precursors.

Carbon precursors generally have a high carbon content and on thermal conversion into carbon produce conductive structures in a high yield. The carbon yields in the carbonization of the carbon precursors are preferably ≥15%, more preferably ≥20%, even more preferably ≥25%, particularly preferably ≥50% and most preferably ≥70%, based on the total weight of the carbon precursors.

Carbon precursors for the matrix are, for example, resorcinol-formaldehyde resin, lignin or polyacrylonitrile.

The carbon produced from the carbon precursors can cover the pores containing silicon particles in the form of a thin layer or form a matrix around the pore spaces.

The core of the core-shell composite particles can optionally contain one or more additional active materials. The additional active materials can, for example, be based on a carbon modification such as graphite, (conductive) carbon black, amorphous carbon, pyrolytic carbon, carbon nanotubes (CNTs), fullerenes, graphene or on the elements Li, Fe, Al, Cu, Ca, K, Na, S, Cl, Zr, Ti, Pt, Ni, Cr, Sn, Mg, Ag, Co, Zn, B, P, Sb, Pb, Ge, Bi, rare earths or combinations thereof. Preferred additional active materials are conductive carbon black, carbon nanotubes, Li and Sn. The content of additional active materials is preferably ≤1% by weight and particularly preferably ≤100 ppm, based on the total weight of the core-shell composite particle.

The pores containing silicon particles are, for example, obtainable by firstly coating the silicon particles with one or more sacrificial materials and coating the resulting products with one or more of the abovementioned carbon precursors and once again removing the coating based on the sacrificial materials at a later point in time, resulting in the coating based on the carbon precursors being converted before or during removal of the sacrificial materials into a matrix based on carbon. In this way, a pore is formed around the silicon particles. The sacrificial materials can be applied in virtually any layer thicknesses in a conventional way, so that core-shell composite particles having the desired pore diameters result.

The coating based on the sacrificial materials has an average layer thickness in the range of preferably from 5 to 300 nm, particularly preferably from 20 to 300 nm and most preferably from 50 to 100 nm (method of determination: scanning electron microscopy (SEM)). The coating based on the sacrificial materials has a layer thickness of preferably from 1 to 300 nm, particularly preferably from 20 to 200 nm and most preferably from 50 to 100 nm, at at least one place (method of determination: scanning electron microscopy (SEM)).

Sacrificial materials can be inorganic or preferably organic in nature.

Examples of inorganic sacrificial materials are oxides, carbonates, silicates, carbides, nitrides or sulphides of the elements silicon, magnesium, calcium, tin, zinc, titanium, nickel. Specific examples of inorganic sacrificial materials are silicon dioxide, zinc oxide, magnesium carbonate and nickel sulphide. Zinc oxide or nickel sulphide can, for example, be converted into volatile compounds and liberated by means of carbothermnal reduction, and magnesium carbonate by thermal decomposition. Silicon dioxide can be leached out in a conventional manner by means of hydrofluoric acid (HF).

Typical organic sacrificial materials have a mass loss of ≥50% by weight, preferably ≥80% by weight and particularly preferably ≥90% by weight, at a temperature selected from the range from 25 to 1000° C.

Examples of organic sacrificial materials are homopolymers or copolymers of ethylenically unsaturated monomers, for example polyethylene, polypropylene, polystyrene, polybutadiene, poly-tert-butoxystyrene, polyvinyl chloride, polyvinyl acetate, polymethacryl methacrylate, polyacrylic acid, polymethacrylate, polyvinyl stearate, polyvinyl laurate or copolymers thereof; polyvinyl alcohol; alkylene glycols such as ethylene glycol, butylene glycol, diethylene glycol, triethylene glycol; polyalkylene oxides such as polyethylene oxides, polypropylene oxides or copolymers thereof; gamma-butyrolactone, propylene carbonate; polyurethanes; and nitrogen-containing solvents such as dimethylformamide, monoethanolamine, N-methyl-2-pyrrolidinone (NMP).

Preferred sacrificial materials are polymers of ethylenically unsaturated monomers, polyalkylene oxides and alkylene glycols. Particularly preferred sacrificial materials are selected from the group consisting of polyethylene, polystyrene, polyacryl methacrylate, polyethylene oxide, polypropylene oxide and polyethylene oxide-polypropylene oxide copolymers.

The shell of the core-shell composite particles is generally based on carbon, in particular on amorphous carbon.

The shell is generally nonporous. Nonporous means in general that the greatest diameters of the pores of the shell are smaller than the greatest diameters of the pores of the matrix containing silicon particles. The carbonization of the carbon precursors according to the invention inevitably leads to the nonporous shell.

The pores of the shell are preferably <10 nm, particularly preferably ≤5 nm and most preferably ≤2 nm (method of determination: pore size distribution by the BJH method (gas adsorption) in accordance with DIN 66134).

The shell preferably has a porosity of ≤2% and particularly preferably ≤1% (method of determining the total porosity: 1 minus [ratio of apparent density (determined by means of xylene pycnometry in accordance with DIN 51901) and skeletal density (determined by means of He pycnometry in accordance with DIN 66137-2)]).

The shell envelopes the core of the core-shell composite particles preferably at least partly and particularly preferably completely. As an alternative, the shell can also fill out or seal or impregnate only the near-surface pore inlets of the core.

The shell is generally impermeable to liquid media, in particular to aqueous or organic solvents or solutions. The shell is particularly preferably impermeable to aqueous or organic electrolytes, acids or alkalis.

The liquid impermeability of the Si/C composite particles is preferably ≥95%, particularly preferably ≥96% and most preferably ≥97%. The liquid impermeability can, for example, be determined according to the method of determination indicated below for the examples.

The proportion of the shell is preferably from 1 to 25% by weight, particularly preferably from 5 to 20% by weight and most preferably from 7 to 15% by weight, based on the total weight of the core-shell composite particles.

The shell of the core-shell composite particles is obtainable by carbonization of one or more carbon precursors according to the invention for the shell.

Examples of carbon precursors for the shell are tars or pitches, in particular high-melting pitches, hard carbon (not graphitizable at temperatures of from 2500 to 3000° C.), soft carbon (graphitizable at temperatures of from 2500 to 3000° C.) or hydrocarbons having from 1 to 20 carbon atoms. Particular preference is given to mesogenic pitch, mesophase pitch, petroleum pitch and hard coal tar pitch.

Examples of hydrocarbons are aliphatic hydrocarbons having from 1 to 10 carbon atoms, in particular from 1 to 6 carbon atoms, preferably methane, ethane, propane, propylene, butane, butene, pentane, isobutane, hexane; unsaturated hydrocarbons having from 1 to 4 carbon atoms, e.g. ethylene, acetylene or propylene; aromatic hydrocarbons such as benzene, toluene, styrene, ethylbenzene, diphenylmethane or naphthalene; further aromatic hydrocarbons such as phenol, cresol, nitrobenzene, chlorobenzene, pyridine, anthracene, phenanthrene.

Preferred carbon precursors for the shell are mesogenic pitch, mesophase pitch, petroleum pitch, hard coal tar pitch, methane, ethane, ethylene, acetylene, benzene, toluene or soft carbon. Particular preference is given to ethylene, acetylene, benzene, toluene or soft carbon. Ethylene, benzene, soft carbon derived from petroleum pitch or hard coal tar pitch are most preferred.

The carbon precursors for the shell can, for example, be applied to the core or to the matrix and subsequently carbonized. Hydrocarbons having from 1 to 20 carbon atoms are preferably carbonized by the CVD process, and the other carbon precursors for the shell are preferably thermally carbonized.

The core-shell composite particles can, for example, be present as isolated particles or as loose agglomerates. The core-shell composite particles can occur in the form of splinters or flakes or preferably in spherical form.

The volume-weighted particle size distributions having diameter percentiles $d_{50}$ of the core-shell composite particles is preferably ≤1 mm, particularly preferably ≤50 µm and most preferably ≤20 µm, but preferably ≥1 µm, particularly preferably ≥5 µm and most preferably ≥10 µm.

The particle size distribution of the core-shell composite particles is preferably monomodal, but can also be bimodal or polymodal and is preferably narrow. The volume-weighted particle size distribution of the core-shell composite particles is characterized by a value for $(d_{90}-d_{10})/d_{50}$ of preferably ≤1 and particularly preferably ≤0.95.

The shell or the core-shell composite particles are characterized by BET surface areas of preferably ≤50 m²/g, particularly preferably ≤25 m²/g and most preferably ≤10 m²/g (determination in accordance with DIN 66131 (using nitrogen)).

The density of the core-shell composite particles is preferably ≥0.85 g/cm³ and particularly preferably ≥1.00 g/cm³ (method of determination: xylene pycnometry in accordance with DIN 51901).

The carbon present in the core-shell composite particles can be exclusively a carbon obtained by carbonization. As an alternative, further components can be used as carbon source, for example graphite, conductive carbon black, carbon nanotubes (CNTs) or other carbon modifications. Preference is given to a high proportion of the carbon of the core-shell composite particles being obtained by carbonization, for example preferably ≥40% by weight, particularly preferably ≥70% by weight and most preferably ≥90% by weight, based on the total mass of the carbon of the core-shell composite particles. As an alternative, from 40 to 90% by weight or from 60 to 80% by weight of the carbon of the core-shell composite particles can have been produced by carbonization, based on the total mass of the carbon of the core-shell composite particles.

The core-shell composite particles preferably contain from 5 to 50% by weight, particularly preferably from 10 to 40% by weight and most preferably from 20 to 40% by weight, of silicon particles. Carbon is present in the core-shell composite particles in a proportion of preferably from 50 to 95% by weight, particularly preferably from 60 to 85% by weight and most preferably from 60 to 80% by weight. Oxygen and preferably nitrogen can optionally also be present in the core-shell composite particles; these are preferably present in chemically bound form as heterocycles, for example as pyridine and pyrrole units (N), furan (O) or oxazoles (N, O). The oxygen content of the core-shell composite particles is preferably ≤20% by weight, particularly preferably ≤10% by weight and most preferably ≤5% by weight. The nitrogen content of the core-shell composite particles is preferably in the range from 0.5 to 10% by weight and particularly preferably from 2 to 5% by weight. The figures in % by weight are in each case based on the total weight of a core-shell composite particle and add up to 100% by weight.

The core-shell composite particles can optionally contain additional components, for example based on inactive materials such as metals (e.g. copper), oxides, carbides or nitrides. The electrochemical stability can be positively influenced thereby. The proportion of inactive materials is preferably ≤10% by weight, more preferably ≤5% by weight and particularly preferably ≤1% by weight, based on the total weight of the core-shell composite particles. Greatest preference is given to no inactive materials of this type being present.

The core-shell composite particles generally have a surprisingly high stability under compressive stress and/or shear stress. The compressive stability and the shear stability of the core-shell composite particles are manifested, for example, by the core-shell composite particles experiencing no change, or only a slight change, in their diameter percentiles $d_{50}$ (volume-weighted particle size distribution) under compressive or shear stress.

The change in the diameter percentiles $d_{50}$ (volume-weighted particle size distribution) of the core-shell composite particles due to a compressive stress of 17 MPa is preferably ≤15%, based on the diameter percentiles $d_{50}$ (volume-weighted particle size distribution) of the core-shell composite particles before the compressive stress. The measurement of the compressive stability is carried out by means of a hydraulic tableting press (from Specac) whose pressing mold (diameter 12 mm) is filled with core-shell composite particles (fill height: 0.5 cm) and subsequently loaded with a weight of 0.2 t (17 MPa). The pressure applied is guided by the pressure for compacting graphite electrodes of 1.6 g/cm$^3$.

The change in the diameter percentiles $d_{50}$ (volume-weighted particle size distribution) of the core-shell composite particles due to a shear stress (high-speed stirrer; 16 m/s; 30 min) is preferably ≥15%, based on the diameter percentiles $d_{50}$ (volume-weighted particle size distribution) of the core-shell composite particles before the shear stress. To measure the shear stability, a dispersion of the core-shell composite particles in a solution of sodium carboxymethylcellulose (Na-CMC, Daicel 1380) (1.4% of Na-CMC in water; weight ratio: core-shell composite particles to Na-CMC=90:10) is stirred by means of a high-speed stirrer (from Getzmann, Dispermat) (circumferential velocity 16 m/s).

The invention further provides processes for producing core-shell composite particles by
1) coating of silicon particles with one or more sacrificial materials,
2) coating of the product from step 1) with one or more carbon precursors,
3) carbonization of the product from step 2), with the sacrificial materials being decomposed and liberated in this carbonization step or in a further step 4) to form a porous composite,
5) coating of the resulting porous composite with one or more carbon precursors according to the invention for the shell,
6) carbonization of the product from step 5) and subsequently
7) optionally removal of undersize or oversize particles, for example by means of typical classification techniques such as sieving or sifting.

The coating in step 1) can, for example, be effected by precipitating sacrificial materials from dispersions containing silicon particles and sacrificial materials. Here, the sacrificial materials deposit on silicon particles. The silicon particles which have been coated in this way can be isolated by subsequent filtration, centrifugation and/or drying. As an alternative, the silicon particles can also be grafted in a conventional way with sacrificial materials.

The coating in step 2 with the carbon precursors can be carried out by methods analogous to those described for step 1).

The carbonization in step 3) can, for example, be carried out thermally, preferably at temperatures of from 400 to 1400° C., particularly preferably from 500 to 1100° C. and most preferably from 700 to 1000° C. Conventional reactors and other customary reaction conditions can be employed for this purpose.

The organic sacrificial material or inorganic sacrificial material, e.g. carbonates, oxides or sulphides, can be decomposed in step 3 or in a further thermal treatment 4). As an alternative, sacrificial materials, in particular inorganic sacrificial materials such as $SiO_2$, can be removed by etching, for example using HF, in a step 4).

The coating in step 5) can in the case of hydrocarbons having from 1 to 20 carbon atoms as carbon precursors be carried out by conventional CVD processes. In the case of the other carbon precursors according to the invention for the shell, the porous composite can be coated as described for step 1).

The carbonization in step 6 can be carried out in a manner analogous to that described for step 3, preferably by thermal treatment.

The individual coating or carbonization steps or else step 4) can otherwise be carried out in a known manner in conventional apparatuses as are known to a person skilled in the present technical field.

The present invention further provides for the use of the core-shell composite particles in electrode materials for lithium ion batteries, in particular for producing the negative electrodes of lithium ion batteries.

The present invention further provides lithium ion batteries having a first electrode as cathode, a second electrode as anode, a membrane arranged between the two electrodes as separator, two connections to the electrodes, a housing accommodating the abovementioned parts and an electrolyte which contains lithium ions and with which the two electrodes are impregnated, with part of the two electrodes containing core-shell composite particles according to the invention.

The core-shell composite particles can be used as silicon component for electrode materials of lithium ion batteries. The production of corresponding lithium ion batteries can be carried out as described by way of example in WO 2015/117838.

The core-shell composite particles of the invention are characterized by significantly improved electrochemical behavior and lead to lithium ion batteries having high volumetric capacities and excellent use properties. The shell or the core-shell composite particles are permeable to lithium ions and electrons and thus allow charge transport. The SEI in lithium ion batteries can be greatly reduced by means of the composite particles of the invention and, due to the inventive design of the composite particles, no longer ruptures or ruptures to a far smaller extent. All this leads to a high cycling stability of corresponding lithium ion batteries. The advantageous effects are brought about by the inventive configuration of the core-shell composite particles, in particular by the targeted, local embedding of the silicon particles in pores according to the invention, the structure of the matrix and of the shell. These features work together in a synergistic way.

The inventive configuration of the pores and the incorporation of silicon particles in such pores is also advantageous for achieving the desired high gravimetric and volumetric capacity or energy density of lithium ion batteries.

The inventive carbon basis of the composite particles is advantageous for the conductivity of the core-shell composite particles, so that both lithium transport and electron transport to the silicon-based active material is ensured. The charge transport to the silicon can be accelerated by direct contact between the silicon particles and the pore walls of the matrix, especially when there is a chemical bond between the silicon particles and the matrix.

The core-shell composite particles of the invention are also surprisingly stable and mechanically strong and, in particular, have a high compressive stability and a high shear stability. The particles have less tendency to crumble under mechanical stress than conventional porous composite particles.

Finally, the processability of the materials to give electrode inks and electrode coatings or a homogeneous distribution of the particles in the electrodes can be improved further by composite particle sizes defined according to the invention or by the narrow particle size distribution of the composite particles.

BRIEF DESCRIPTION OF THE DRAWINGS

The invention is also illustrated hereinafter by figures, wherein.

Figure 1:
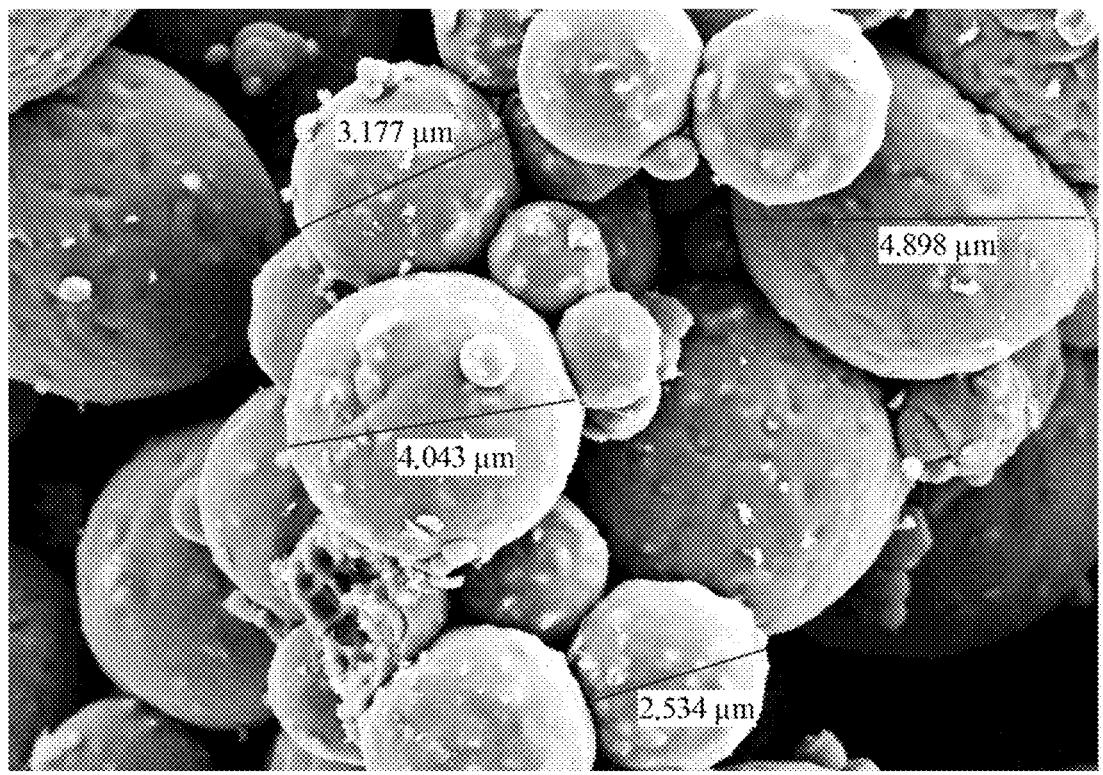
FIG. 1 shows an SEM image of porous core-shell composite particles obtained in Example 2 at 7500× magnification.

The following examples serve to illustrate the invention:

The following analytical methods and instruments were used for characterization:

Scanning electron microscopy (SEM/EDX):

The microscopic studies were carried out using a Zeiss Ultra 55 scanning electron microscope and an INCA x-sight energy dispersive X-ray spectrometer. Carbon was vapor-deposited on to the samples by means of a Baltec SCD500 sputter/carbon-coating instrument in order to prevent charging phenomena. The cross sections of the core-shell composite particles shown in the figures were produced using a Leica TIC 3× ion cutter at 6 kV.

Inorganic analysis/elemental analysis:

The C contents reported in the examples were determined using a Leco CS 230 analyzer; to determine 0 and optionally N and H contents, a Leco TCH-600 analyzer was used. The qualitative and quantitative determination of other indicated elements in the core-shell composite particles obtained were determined by means of ICP (inductively coupled plasma) emission spectrometry (Optima 7300 DV, from Perkin Elmer). The samples were for this purpose digested with acid ($HF/HNO_3$) in a microwave (Microwave 3000, from Anton Paar). The ICP-OES determination is based on ISO 11885 "water quality—determination of selected elements by inductively coupled plasma optical emission spectrometry (ICP-OES) (ISO 11885:2007); German version EN ISO 11885:2009", which is used for analysis of acidic, aqueous solutions (e.g. acidified mains water, wastewater and other water samples, aqua regain extracts of soils and sediments).

Particle Size Determination:

The determination of the particle size distribution was for the purposes of the present invention carried out in accordance with ISO 13320 by means of static laser light scattering using a Horiba LA 950. Here, in the preparation of the samples, particular attention has to be paid to the dispersing of the particles in the measurement solution in order not to measure the size of agglomerates instead of individual particles. In the case of the core-shell composite particles examined here, the particles were dispersed in ethanol. For this purpose, the dispersion was, if required, treated with 250 W ultrasound for 4 minutes in a Hielscher Ultrasonic Laboratory Instrument Model UIS250v with ultrasonic probe LS24d5 before the measurement.

Thermogravimetric analysis (TGA):

The ratio of various carbon modifications in a composite (conductive carbon black (CCB) in addition to amorphous carbon (C)) was determined by means of thermogravimetric analysis using a Mettler Thermobalance TGA 851. The measurement was carried out under oxygen as measurement gas in the temperature range 25-1000° C. and at a heating rate of 10° C./min. In the presence of conductive carbon black and C, the decrease in mass caused by combustion of the total carbon takes place in the temperature range 400-650° C. in two stages, from the ratio of which the C:CCB ratio indicated in the relevant examples was determined.

Surface area measurement by the BET method:

The specific surface of the materials was measured by the BET method via gas adsorption using nitrogen and a Sorptomatic 199090 instrument (Porotec) or SA-9603MP instrument (Horiba).

Si accessibility in relation to liquid media (liquid impermeability):

The determination of the accessibility of silicon in the core-shell composite particles in relation to liquid media was carried out using the following test method on materials having a known silicon content (from elemental analysis): 0.5-0.6 g of core-shell composite particles were firstly dispersed by means of ultrasound in 20 ml of a mixture of NaOH (4M; $H_2O$) and ethanol (1:1 vol.) and subsequently stirred at 40° C. for 120 minutes. The composite particles were filtered through a 200 nm nylon membrane, washed with water to a neutral pH and subsequently dried at 100° C./50-80 mbar in a drying oven. The silicon content after the NaOH treatment was determined and compared with the Si content before the test. At a relative change in the Si content of ≤5%, the composite structure is considered to be impermeable (corresponds to an impermeability of ≥95%).

Apparent Density:

The apparent density (=density of the porous solid body based on the volume including the pore spaces) was determined by means of pycnometry on dispersions of the composite powder in xylene as average of at least 2 measurements using a method based on the standard DIN51901 "Testing of carbonaceous materials—determination of density by the xylene method—solid materials".

Theoretical Capacity:

The theoretical capacity indicated in the examples for the core-shell composite particles obtained was not determined experimentally but instead calculated from the elemental composition of the materials. Here, the following capacities of the pure components were used as basis for the calculation: Si 4199 mAh/g; (amorphous) carbon 100 mAh/g; N (as part of the amorphous C matrix) 100 mAh/g. Furthermore, it was assumed in the calculation that O contents present in the composites are present in the form of $SiO_2$ and thus reduce the contribution of the active silicon taking into account the $SiO_2$ content.

The following materials were procured from commercial sources or produced in-house and used directly without further purification:

A suspension of silicon nanopowder (splinter-like, unaggregated Si particles, produced in-house by wet milling in ethanol (solids content 22% by weight, $d_{50}$=180 nm) or 2-propanol (solids content 20% by weight; $d_{50}$=200 nm) in a stirred bore mill), polyacrylonitrile (Mw=150 000; Sigma-Aldrich), dimethylformamide (DMF; extra pure; Sigma-Aldrich), polyethylene oxide-polypropylene oxide copolymer (Pluronic P123®; Sigma-Aldrich), pitch (high-melting; softening point 235° C.)

COMPARATIVE EXAMPLE 1

Embedding of polymer-coated silicon nanoparticles in a carbon precursor (polyacrylonitrile):

Polymer-coated silicon nanopowder (27.6 g; containing 3.6 g of silicon and 24 g of polyethylene oxide-polypropylene oxide copolymer (Pluronic P123®)) was dispersed in a solution of 48 g of polyacrylonitrile (PAN) in 3200 ml of DMF by means of ultrasound (Hielscher UIS250V; amplitude 80%, cycle: 0.9; duration: 30 min). The resulting dispersion was sprayed and dried using a laboratory spray dryer model B-290 (BUCHI GmbH) with inert loop B-295 and dehumidifier B-296 (BUCHI GmbH) (nozzle tip 0.7 mm; nozzle cap 1.4 mm; nozzle temperature 180° C.; $N_2$ gas flow 30; aspirator 100%; pump 20%).

64.8 g of a fine, brown powder (precomposite) were obtained (yield 86%).

Carbonization of the Precomposite:

31.3 g of the precomposite described above were placed in a fused silica boat (QCS GmbH) and carbonized in a three-zone tube furnace (TFZ 12/65/550/E301; carbolite GmbH) using cascade regulation including a sample element type N and argon/$H_2$ as inert gas: firstly heating rate 10° C./min, temperature 300° C., hold time 90 min, Ar/$H_2$ flow rate 200 ml/min; then directly further at heating rate 10° C./min, temperature 1000° C., hold time 3 h, Ar/$H_2$ flow rate 200 ml/min. After cooling, 9.00 g of a black powder were obtained (carbonization yield 29%), and this was freed of oversize by means of wet sieving. 3.89 g of porous composite particles having a particle size of $d_{99}$<20 μm were obtained.

Elemental composition: Si 15.8% by weight; C 75.2% by weight; O 4.58% by weight; N 4.25% by weight; B<50 ppm; P 200 ppm; Al<50 ppm; <50 ppm; Cu<10 ppm; K 340 ppm; Li<10 ppm; Zr 720 ppm;

Particle size distribution: monomodal; $d_{10}$: 8.03 μm, $d_{50}$: 13.6 μm, $d_{90}$: 20.9 μm; $(d_{90}-d_{10})/d_{50}$=0.95;

Spec. surface area (BET)=23.1 $m^2$/g;

Si impermeability: 92.4% (not liquid-impermeable);

Theoretical capacity: 573 mAh/g.

EXAMPLE 2

The porous core-shell composite particles from Example 1 were provided with a coating of amorphous carbon (based on soft carbon; 10% by weight):

3.89 g of the porous composite particles obtained in Example 1 after the carbonization step were dispersed together with 630 mg of pitch (high-melting; softening point 235° C.) in 60 ml of p-xylene by means of ultrasound (Hielscher UIS250V; amplitude 80%, cycle: 0.9; duration: 30 min). The suspension was stirred under reflux for 90 minutes and cooled to room temperature over a period of 14 h. The solvent was removed under reduced pressure and the pitch-coated composite particles were transferred to a fused silica boat (QCS GmbH) and carbonized using cascade regulation including a sample element type N and argon/$H_2$ as inert gas: firstly heating rate 10° C./min, temperature 250° C.; then directly further at heating rate 5° C./min, temperature 550° C.; then directly further at 10° C./min, 1000° C., hold time 2 h, Ar/$H_2$ flow rate 200 ml/min. After cooling, 3.99 g of a black powder were obtained (carbonization yield 88%) and this was freed of oversize by means of wet sieving. 3.06 g of porous Si/C composite particles having an impermeable outer C coating and a particle size of $d_{99}$<20 μm were obtained.

Elemental composition: Si 13.2% by weight; C 79.4% by weight; O 3.58% by weight; N 3.79% by weight; B<50 ppm; P<200 ppm; Al<50 ppm; Ca<50 ppm; Cu<10 ppm; K 342 ppm; Li<10 ppm; Zr 669 ppm;

Particle size distribution: monomodal; $d_{10}$: 7.92 μm, $d_{50}$: 12.9 μm, $d_{90}$: 19.6 μm; $(d_{90}-d_{10})/d_{50}$=0.91;

Spec. surface area (BET)=2.2 $m^2$/g;

Si impermeability: 97.7% (liquid-impermeable);

Theoretical capacity: 506 mAh/g.

FIG. 1 shows the SEM image of the porous core-shell composite particles obtained in Example 2 (7500× magnification). The surface is smooth and closed and thus liquid-impermeable.

Figure 2:
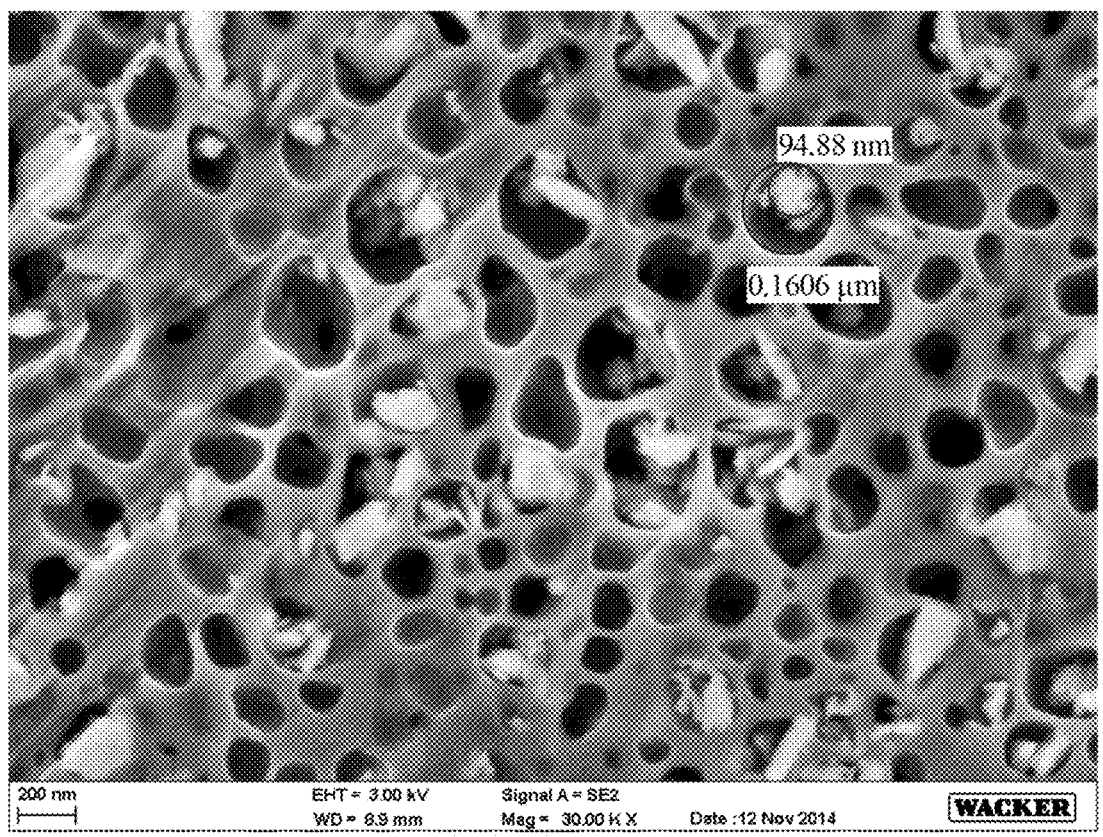
FIG. 2 shows an SEM section through a porous core-shell composite particle obtained in Example 2 at 30,000× magnification.

FIG. 2 shows an SEM section through a porous core-shell composite particle obtained in Example 2 (30,000× magnification). The silicon particles are embedded in local macropore spaces which can buffer the volume expansion of the silicon. It is possible to see, for example, a particle having a diameter of ~95 nm embedded in a pore space having a diameter of ~161 nm (dP~1.7*dSi).

COMPARATIVE EXAMPLE 3

Production of a porous core-shell composite particle without impermeable coating, which additionally contains conductive carbon black (Super P) in the interior:

13.5 g of polyacrylonitrile (PAN) and 6.75 g of polyethylene oxide-polypropylene oxide copolymer (Pluronic P123®) were dissolved in 900 ml of dimethylformamide (DMF) at room temperature. 13.8 g of a silicon nanopowder suspension (26.9% in isopropanol; corresponding to 3.71 g of nano-Si) and 1.78 g of conductive carbon black (Super P) were dispersed in the PAN solution by means of ultrasound (Hielscher UIS250V; amplitude 80%, cycle: 0.9; duration: 15 min). The resulting dispersion was sprayed and dried using a laboratory spray dryer model B-290 (BUCHI GmbH) with inert loop B-295 and dehumidifier B-296 (BUCHI GmbH) (nozzle tip 0.7 mm; nozzle cap 1.4 mm; nozzle temperature 130° C.; $N_2$ gas flow ~30; aspirator 100%; pump 20%). 19.2 g of a brownish black powder were obtained (75% yield). 19.0 g of the Si/Pluronic/conductive carbon black/PAN powder were placed in a fused silica boat (QCS GmbH) and carbonized in a three-zone tube furnace (TFZ 12/65/550/E301; Carbolite GmbH) using cascade regulation including a sample element type N and argon/$H_2$ as inert gas: firstly heating rate 10° C./min, temperature 300° C., hold time 90 min, Ar/$H_2$ flow rate 200 ml/min; then directly further at heating rate 10° C./min, temperature 1000° C., hold time 3 h, Ar/$H_2$ flow rate 200 ml/min. After cooling, 7.59 g of a black powder were obtained (carbonization yield 40%) and this was freed of oversize by means of wet sieving. 5.03 g of porous composite particles having a particle size of $d_{99}$<20 µm were obtained.

Elemental composition: Si 26.4% by weight; C 65.1% by weight (of which 17% by weight is conductive carbon black); O 4.99% by weight; N 3.37% by weight; B 50 ppm; P 100 ppm; Al<50 ppm; Ca 35 ppm; Cu<10 ppm; K 157 ppm; Fe 103 ppm; Li<10 ppm; Zr 1400 ppm;

Particle size distribution: monomodal; $d_{10}$: 5.82 µm, $d_{50}$: 10.4 µm, $d_{90}$: 16.7 µm; $(d_{90}-d_{10})/d_{50}$=1.0;

Spec. surface area (BET)=35.4 m$^2$/g;

Si impermeability: 13.7% (not liquid-impermeable);

Apparent density: ~2.2 g/cm$^3$;

Theoretical capacity: 976 mAh/g.

EXAMPLE 4 (EX. 4)

The porous core-shell composite particles containing conductive carbon black from Example 3 were provided with an additional coating composed of amorphous carbon (soft carbon; 10% by weight):

4.54 g of the porous composite particles obtained in Example 3 after the carbonization step were dispersed together with 720 mg of pitch (high-melting; softening point 235° C.) in 60 ml of p-xylene by means of ultrasound (Hielscher UIS250V; amplitude 80%, cycle: 0.9; duration: 30 min). The suspension was stirred under reflux for 90 minutes and cooled to room temperature over a period of 14 h. The solvent was removed under reduced pressure, and the pitch-coated composite particles were transferred to a fused silica boat (QCS GmbH) and carbonized using cascade regulation including a sample element type N and argon/$H_2$ as inert gas: firstly heating rate 10° C./min, temperature 250° C.; then directly further at heating rate 5° C./min, temperature 550° C.; then directly further at 10° C./min, 1000° C., hold time 2 h, Ar/$H_2$ flow rate 200 ml/min. After cooling, 4.86 g of porous Si/C composite particles having an impermeable outer C coating and a particle size of $d_{99}$<20 µm were obtained (carbonization yield 93%).

Elemental composition: Si 25.7% by weight; C 67.4% by weight (of which 15% by weight is conductive carbon black); O 3.90% by weight; N 2.87% by weight; B<25 ppm; P<100 ppm; Al 50 ppm; Ca 44 ppm; Cu<10 ppm; K 158 ppm; Li<10 ppm; Zr 1300 ppm;

Particle size distribution: monomodal; $d_{10}$: 5.17 µm, $d_{50}$: 8.66 µm, $d_{90}$: 13.7 µm; $(d_{90}-d_{10})/d_{50}$=0.98;

Spec. surface area (BET)=23.0 m$^2$/g;

Si impermeability: 95.6% (liquid-impermeable);

Theoretical capacity: 991 mAh/g.

EXAMPLE 5

Production of an electrode coating using the composite from Example 4:

0.24 g of conductive carbon black (Imerys, Super C65) were dissolved in 11.34 g of a 1.4% by weight solution of sodium carboxymethylcellulose (Daicel, Grade 1380) in water by means of a high-speed stirrer at a circumferential velocity of 4.5 m/s for 5 min and 17 m/s for 30 min with cooling at 20° C. After addition of 1.50 g of the composite material from Example 4, 1.02 g of water and 0.60 g of ethanol, the mixture was then stirred at a circumferential velocity of 12 m/s for a further 30 minutes. After degassing, the dispersion was applied in a thickness of 0.030 mm to a copper foil (Schlenk Metallfolien, SE-Cu58) by means of a film drying frame having a gap height of 0.16 mm (Erichsen, model 360). The electrode coating produced in this way was subsequently dried for 60 minutes at 80° C. and an air pressure of 1 bar. The average weight per unit area of the dry electrode coating was 1.55 mg/cm$^2$.

EXAMPLE 6

Electrochemical testing of electrodes from Example 5 The electrochemical studies were carried out on a half cell in a three-electrode arrangement (zero-current potential measurement). The electrode coating from Example 5 was used as working electrode, lithium foil (Rockwood Lithium, thickness 0.5 mm) was used as reference electrode and counterelectrode. A 6-layer nonwoven stack (Freudenberg Vliesstoffe, FS2226E) impregnated with 100 µl of electrolyte served as separator. The electrolyte used consisted of a 1 molar solution of lithium hexafluorophosphate in a 3:7 (v/v) mixture of ethylene carbonate and diethyl carbonate admixed with 2% by weight of vinylene carbonate. The construction of the cell was carried out in a glove box (<1 ppm $H_2$, $O_2$); the water content in the dry mass of all components used was below 20 ppm.

The electrochemical testing was carried out at 20° C. The charging or lithiation of the electrode was carried out by the cc/cv method (constant current/constant voltage) using a constant current of 80 mA/g (corresponding to C/10) in the first two cycles and of 160 mA/g (corresponding to C/5) in the subsequent cycles and after reaching the voltage limit of 5 mV at a constant voltage until the current dropped below 16 mA/g or 40 mA/g. Discharging of the cell was carried out by the cc method (constant current) using a constant current of 80 mA/g (corresponding to C/10) in the first two cycles and of 400 mA/g (corresponding to C/2) in the subsequent cycles until the voltage limit of 1.5 V had been reached. The specific current chosen was based on the weight of the coating from Example 5.

Figure 3:
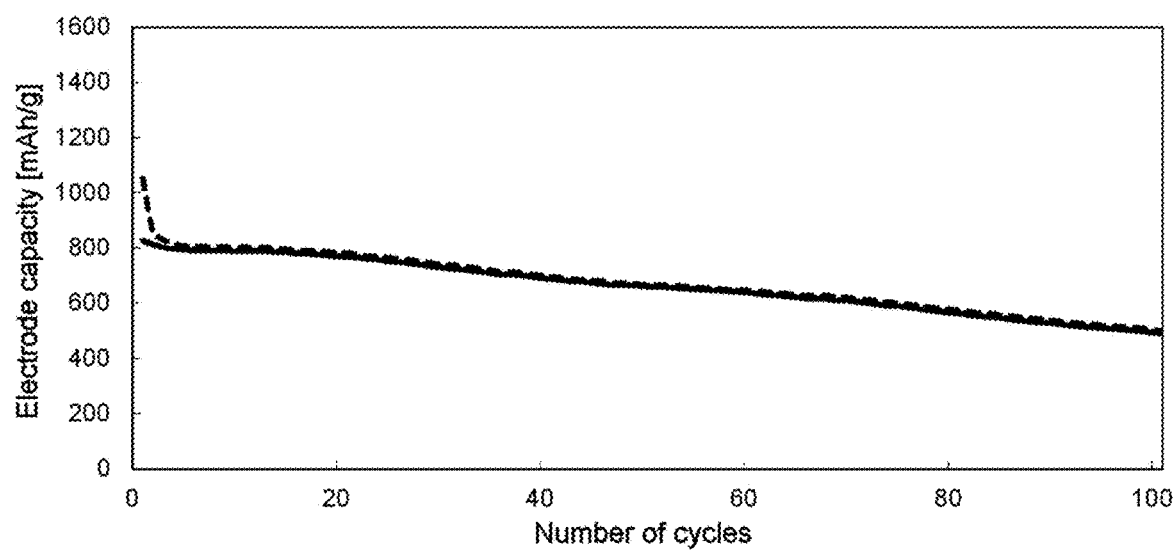
FIG. 3 shows the charging (broken line) and discharging capacity (solid line) of a half cell having the electrode coating from Example 5 as a function of the number of cycles.

FIG. 3 shows the charging (broken line) and discharging capacity (solid line) of a half cell having the electrode coating from Example 5 as a function of the number of cycles. The electrode coating from Example 5 has a coulombic efficiency in the first cycle of 78.5% and a reversible initial capacity of about 800 mAh/g. After 60 charging/discharging cycles, it still has 80% of its original capacity.

COMPARATIVE EXAMPLE 7 (CEX. 7)

A Si/C composite particle was produced by the procedure described in Example 3, but without addition of Pluronic® as pore former (→ no local porosity) and without the impermeable outer C coating described in Ex. 4. After carbonization (carbonization yield 72%) and removal of oversize by means of wet sieving, 321 mg of nonporous composite particles having a particle size of $d_{99}$<20 µm were obtained.

Elemental composition: Si 25.1% by weight; C 68.0% by weight (of which ~14% by weight is conductive carbon black); O 4.40% by weight; N 2.30% by weight; Al 50 ppm; Ca 56 ppm; Cu <10 ppm; K 130 ppm; Li<10 ppm;

Particle size distribution: Bimodal; $d_{10}$: 0.22 µm, $d_{50}$: 2.76 µm, $d_{90}$: 10.3 µm; $(d_{90}-d_{10})/d_{50}$=3.65;

Spec. surface area (BET)=102.9 m²/g;

Si impermeability: 8.0% (not liquid-impermeable);

Theoretical capacity: 963 mAh/g.

COMPARATIVE EXAMPLE 8

Production of an electrode coating using the composite from Comparative Example 7:

0.21 g of conductive carbon black (Imerys, Super C65) were dispersed in 9.92 g of a 1.4% by weight solution of sodium carboxymethylcellulose (Daicel, Grade 1380) in water by means of high-speed stirrer at a circumferential velocity of 4.5 m/s for 5 min and of 17 m/s for 30 min with cooling at 20° C. After addition of 1.40 g of the composite material from Comparative Example 7 and 3.52 g of water, the mixture was then stirred at a circumferential velocity of 12 m/s for a further 30 minutes. After degassing, the dispersion was applied in a thickness of 0.030 mm to a copper foil (Schlenk Metallfolien, SE-Cu58) by means of a film drying frame having a gap height of 0.10 mm (Erichsen, model 360). The electrode coating produced in this way was subsequently dried for 60 minutes at 80° C. and an air pressure of 1 bar. The average weight per unit area of the dry electrode coating was 0.63 mg/cm².

COMPARATIVE EXAMPLE 9

Electrochemical testing of electrodes from Comparative Example 8:

Electrodes having the composite from Comparative Example 7 were tested as described in Example 6.

Figure 4:
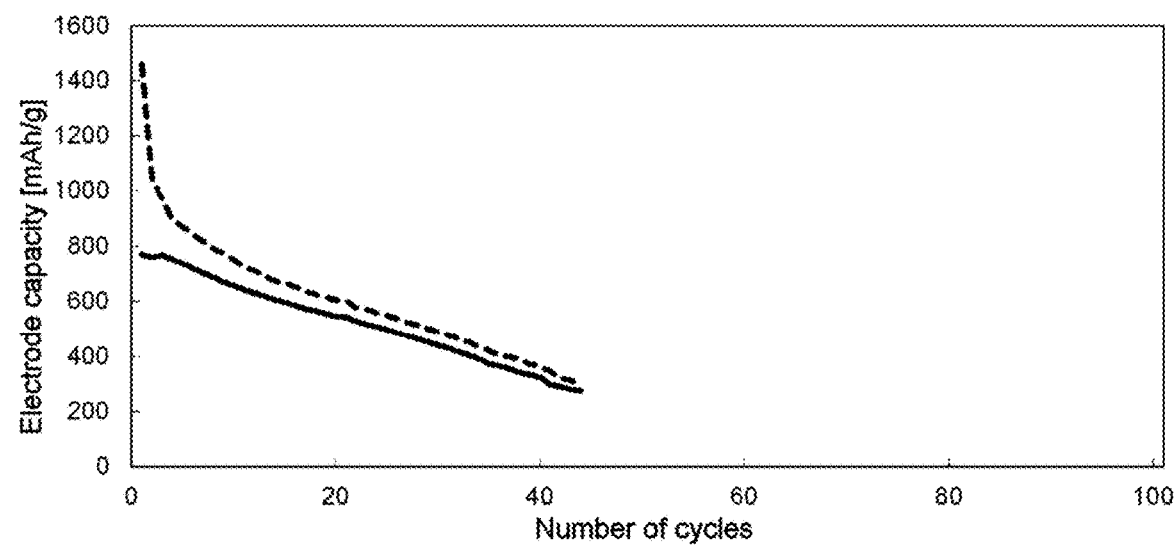
FIG. 4 shows the charging (broken line) and discharging capacity (solid line) of a half cell having the electrode coating from Comparative Example 8 as a function of the number of cycles.

FIG. 4 shows the charging (broken line) and discharging capacity (solid line) of a half cell having the electrode coating from Comparative Example 8 as a function of the number of cycles. The electrode coating from Comparative Example 8 has a coulombic efficiency in the first cycle of 52.8% and a reversible initial capacity of about 800 mAh/g. After only 15 charging/discharging cycles, it has dropped to 80% of its original capacity.

As can be seen from Table 1, half cells having electrodes based on the composite of the invention having local porosity and an impermeable carbon coating (Example 4) surprisingly display a higher coulombic efficiency in the first cycle (=lower irreversible decreasing capacity) and also more stable electrochemical behavior in the subsequent cycles compared to electrodes based on the analogous composite without local porosity and carbon coating (Comparative Example 7) at a comparable reversible initial capacity.

TABLE 1

Testing results of the composites from Example 4 and Comparative Example 7 in lithium ion batteries:

| (C)Ex. | Composite | Discharging capacity after cycle 1 [mAh/g] | Coulombic efficiency for cycle 1 [%] | Number of cycles with >80% capacity retention |
|---|---|---|---|---|
| | Ex. 4 | 810 | 78.5 | 60 |
| | CEx. 7 | 780 | 52.8 | 15 |

The invention claimed is:

1. Core-shell composite particles comprising a core and a shell, wherein:

the core of the core-shell composite particles has volume-weighted particle size distribution having diameter percentiles $d_{50}$ of ≥5 µm and ≤90 µm, and each core is a porous, carbon-based matrix which contains silicon particles in which the silicon particles are enclosed in pores of the matrix, the pores containing silicon particles have a free volume in addition to the silicon particles, and a diameter of ≥60 nm and ≤350 nm, the core is free of all the following additional active materials or contains one or more of the following additional active materials in a collective amount not exceeding 1% by weight based on a total weight of the core-shell composite particles: graphite, carbon nanotubes, fullerenes, graphene, Li, Fe, Al, Cu, Ca, N, Na, S, Cl, Zr, Ti, Pt, Ni, Cr, Sn, Mg, Ag, Co, Zn, P, P, Sb, Pb, Ge, Bi and rare earths, and the shell is a nonporous shell obtainable by carbonization of one or more carbon precursors selected from the group consisting of tars, pitches, hard carbon, soft carbon and hydrocarbons having from 1 to 20 carbon atoms, wherein any pores present in the shell are less than 5 nm in diameter.

2. Core-shell composite particles according to claim 1, wherein a ratio of the diameter of the pores of the matrix containing silicon particles to a diameter of the silicon particles is ≥1.1 and ≤3.

3. Core-shell composite particles according to claim 1, wherein the matrix is based on carbon which is obtainable by carbonization of one or more carbon precursors selected from the group consisting of resorcinol-formaldehyde resin, lignin and polyacrylonitrile.

4. Core-shell composite particles according to claim 1, wherein the pores containing silicon particles are obtainable by firstly coating silicon particles with one or more sacrificial materials to provide coated silicon particles having a first coating and coating the coated silicon particles with a second coating comprising one or more carbon precursors and once again removing the first coating based on the sacrificial materials at a later point in time, resulting in the second coating based on the carbon precursors being converted before or during removal of the sacrificial materials into a matrix based on carbon.

5. Core-shell composite particles according to claim 4, wherein the sacrificial materials are inorganic or organic in nature, where inorganic sacrificial materials comprise oxides, carbonates, silicates, carbides, nitrides or sulphides of the elements silicon, magnesium, calcium, tin, zinc, titanium or nickel and organic sacrificial materials are selected from the group consisting of polyethylene, polypropylene, polystyrene, polybutadiene, poly-tert-butoxystyrene, polyvinyl chloride, polyvinyl acetate, polymethacryl methacrylate, polyacrylic acid, polymethacrylate, polyvinyl stearate polyvinyl laurate and copolymers thereof; polyvinyl alcohol; alkylene glycol; polyalkylene oxide; gamma-butyrolactone; propylene carbonate; polyurethane; dimethylformamide, monoethanolamine and N-methyl-2-pyrrolidinone.

6. Core-shell composite particles according to claim 1, wherein any pores present in the shell are less than 2 nm in diameter.

7. Core-shell composite particles according to claim 1, wherein a proportion of the shell is from 5 to 20% by weight and/or a proportion of the core is from 80 to 95% by weight, where % by weight figures are based on a total weight of the core-shell composite particles and in each case add up to 100% by weight.

8. Core-shell composite particles according to claim 1, wherein the core-shell composite particles have volume-weighted particle size distributions having diameter percentiles $d_{50}$ of ≥1 µm and ≤1 mm.

9. Core-shell composite particles according to claim 1, wherein a change in diameter percentiles $d_{50}$ (volume-weighted particle size distribution) of the core-shell composite particles due to a compressive stress of 17 MPa is ≤15%, based on the diameter percentiles $d_{50}$ (volume-weighted particle size distribution) of the core-shell composite particles before the compressive stress.

10. Core-shell composite particles according to claim 1, wherein a change in diameter percentiles $d_{50}$ (volume-weighted particle size distribution) of the core-shell composite particles due to a shear stress (high-speed stirrer; 16 m/s; 30 min) is <15%, based on the diameter percentiles $d_{50}$ (volume-weighted particle size distribution) of the core-shell composite particles before the shear stress.

11. Core-shell composite particles according to claim 1, wherein the core is free of graphite.

12. Core-shell composite particles according to claim 1, wherein the core contains graphite in an amount greater than 0% by weight based on a total weight of the core-shell composite particles and not exceeding 1% by weight based on a total weight of the core-shell composite particles.

13. Core-shell composite particles according to claim 1, wherein the pores containing silicon particles have a pore volume that is 3-4 times a volume of the silicon particles contained therein.

14. Core-shell composite particles according to claim 1, wherein the silicon particles are present essentially in the free volume of the pores.

15. Core-shell composite particles according to claim 1, wherein the pores are isolated from each other.

16. Core-shell composite particles according to claim 1, wherein the pores are not connected to one another via channels.

17. Core-shell composite particles according to claim 1, wherein the shell is impermeable to aqueous and organic electrolytes, acids and alkalis.

18. A lithium ion battery having a first electrode as a cathode, a second electrode as an anode, a membrane arranged between the two electrodes as a separator, two connections to the electrodes, a housing accommodating the above-mentioned parts and an electrolyte which contains lithium ions and with which the two electrodes are impregnated, with part of the two electrodes containing core-shell composite particles according to claim 1.

19. A process for producing the core-shell composite particles of claim 1 comprising the steps:
 1) coating of silicon particles with one or more sacrificial materials to provide a product of step 1),
 2) coating of the product of step 1) with one or more carbon precursors to provide a product of step 2),
 3) carbonization of the product of step 2), with the sacrificial materials being decomposed and liberated in this carbonization step or in a further step 3') to form a porous composite,
 4) coating of the resulting porous composite with one or more carbon precursors selected from the group consisting of tars, pitches, hard carbon, soft carbon and hydrocarbons having from 1 to 20 carbon atoms to provide a product of step 4),
 6) carbonization of the product of step 4) and subsequently
 7) optionally removal of undersize or oversize particles.

20. Core-shell composite particles according to claim 1, wherein the silicon particles have volume-weighted particle size distributions having diameter percentiles $d_{50}$ of ≥50 nm and less than the diameter percentiles $d_{50}$ of the pores of the matrix.

21. Core-shell composite particles according to claim 20, wherein a ratio of the diameter of the pores of the matrix containing silicon particles to a diameter of the silicon particles is ≥1.1 and ≤3.

22. Core-shell composite particles according to claim 21, wherein the matrix is based on carbon which is obtainable by carbonization of one or more carbon precursors selected from the group consisting of resorcinol-formaldehyde resin, lignin and polyacrylonitrile.

23. Core-shell composite particles according to claim 22, wherein the pores containing silicon particles are obtainable by firstly coating silicon particles with one or more sacrificial materials to provide coated silicon particles having a first coating and coating the coated silicon particles with a second coating comprising one or more carbon precursors and once again removing the first coating based on the sacrificial materials at a later point in time, resulting in the second coating based on the carbon precursors being converted before or during removal of the sacrificial materials into a matrix based on carbon.

24. Core-shell composite particles according to claim 23, wherein the sacrificial materials are inorganic or organic in nature, where inorganic sacrificial materials comprise oxides, carbonates, silicates, carbides, nitrides or sulphides of the elements silicon, magnesium, calcium, tin, zinc, titanium or nickel and organic sacrificial materials are selected from the group consisting of polyethylene, polypropylene, polystyrene, polybutadiene, poly-tert-butoxystyrene, polyvinyl chloride, polyvinyl acetate, polymethacryl methacrylate, polyacrylic acid, polymethacrylate, polyvinyl stearate polyvinyl laurate and copolymers thereof; polyvinyl alcohol; alkylene glycol; polyalkylene oxide; gamma-butyrolactone; propylene carbonate; polyurethane; dimethylformamide, monoethanolamine and N-methyl-2-pyrrolidinone.

25. Core-shell composite particles according to claim 24, wherein any pores present in the shell are less than 2 nm in diameter.

26. Core-shell composite particles according to claim 25, wherein a proportion of the shell is from 5 to 20% by weight and/or a proportion of the core is from 80 to 95% by weight, where % by weight figures are based on a total weight of the core-shell composite particles and in each case add up to 100% by weight.

27. Core-shell composite particles according to claim 26, wherein the core-shell composite particles have volume-weighted particle size distributions having diameter percentiles $d_{50}$ of ≥1 µm and ≤1 mm.

28. Core-shell composite particles according to claim 27, wherein a change in diameter percentiles $d_{50}$ (volume-weighted particle size distribution) of the core-shell composite particles due to a compressive stress of 17 MPa is ≤15%, based on the diameter percentiles $d_{50}$ (volume-weighted particle size distribution) of the core-shell composite particles before the compressive stress.

29. Core-shell composite particles according to claim 28, wherein the change in the diameter percentiles $d_{50}$ (volume-weighted particle size distribution) of the core-shell composite particles due to a shear stress (high-speed stirrer; 16 m/s; 30 min) is ≤15%, based on the diameter percentiles $d_{50}$ (volume-weighted particle size distribution) of the core-shell composite particles before the shear stress.

30. A process for producing the core-shell composite particles of claim 29 comprising the steps:
1) coating of silicon particles with one or more sacrificial materials to provide a product of step 1),
2) coating of the product of step 1) with one or more carbon precursors to provide a product of step 2),
3) carbonization of the product of step 2), with the sacrificial materials being decomposed and liberated in this carbonization step or in a further step 3') to form a porous composite,
4) coating of the resulting porous composite with one or more carbon precursors selected from the group consisting of tars, pitches, hard carbon, soft carbon and hydrocarbons having from 1 to 20 carbon atoms to provide a product of step 4),
6) carbonization of the product of step 4) and subsequently
7) optionally removal of undersize or oversize particles.

31. A lithium ion battery having a first electrode as a cathode, a second electrode as an anode, a membrane arranged between the two electrodes as a separator, two connections to the electrodes, a housing accommodating the above-mentioned parts and an electrolyte which contains lithium ions and with which the two electrodes are impregnated, with part of the two electrodes containing core-shell composite particles according to claim 29.

* * * * *